Figure 1:
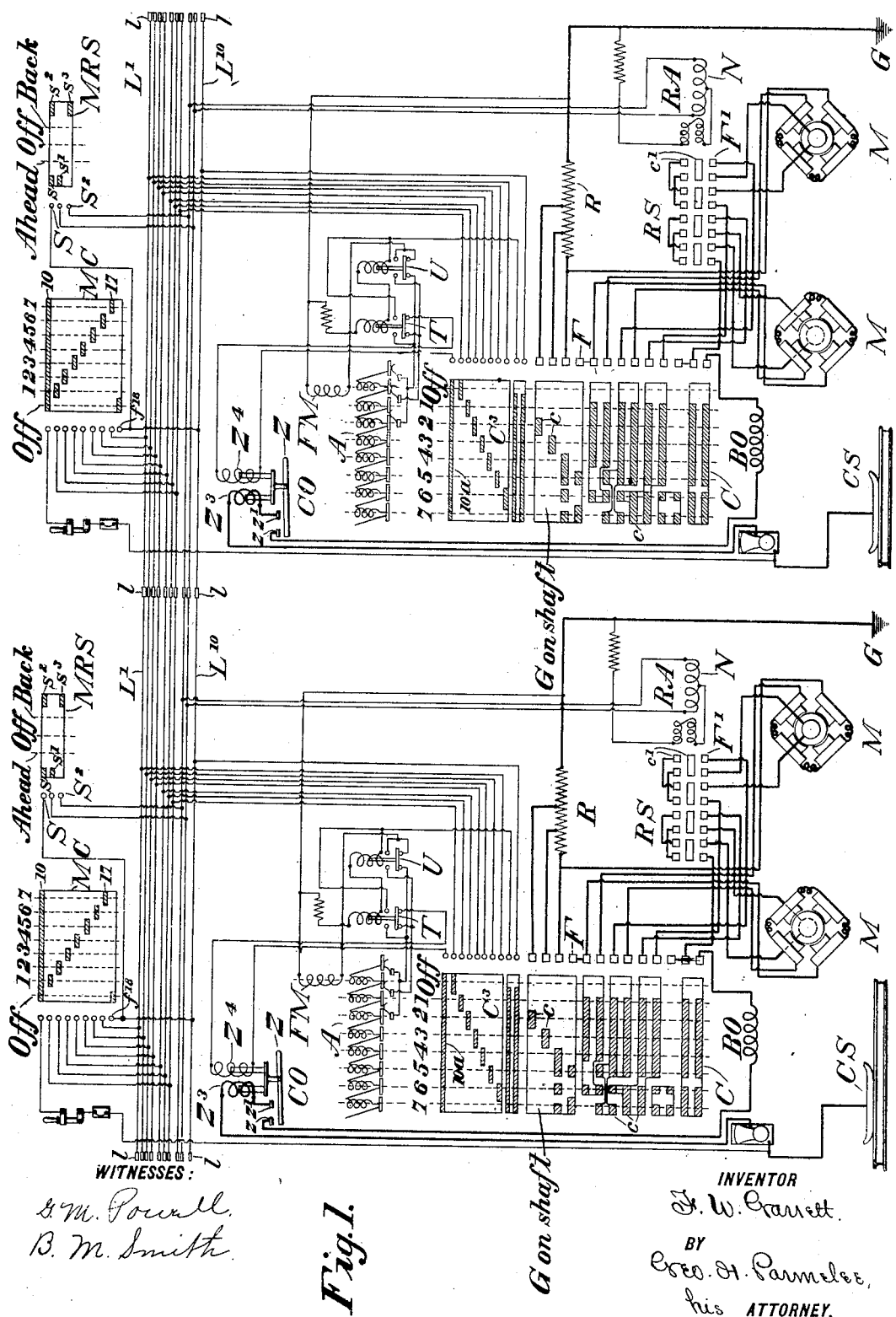

No. 665,320. Patented Jan. 1, 1901.
F. W. GARRETT.
CONTROLLER FOR ELECTRIC MOTORS.
(Application filed Mar. 26, 1900.)
(No Model.) 5 Sheets—Sheet 3.
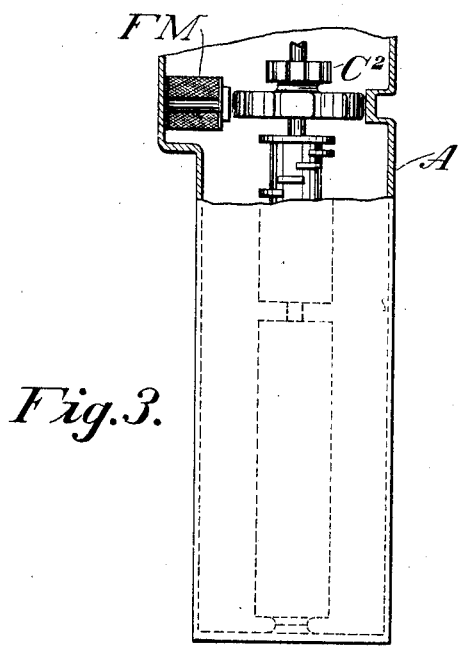
*Fig. 3.*
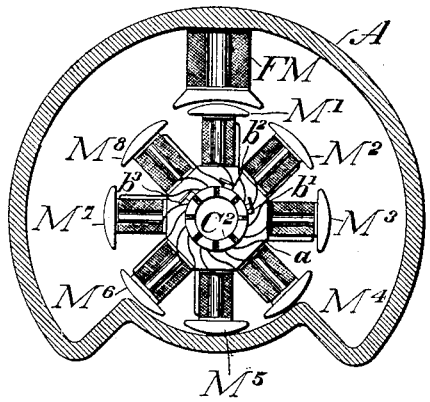
*Fig. 4.*
*Fig. 5.*
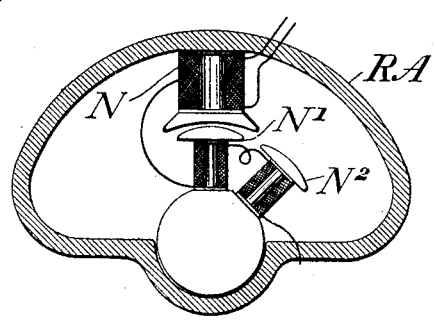
*Fig. 6.*
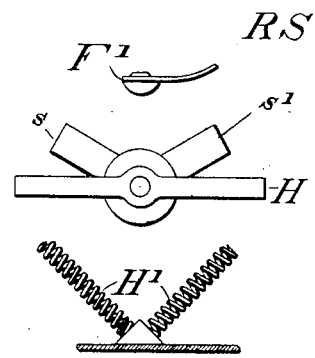
WITNESSES:
G. M. Powell.
B. M. Smith.
INVENTOR
F. W. Garrett,
BY
Geo. H. Parmelee,
his ATTORNEY.

No. 665,320.  
F. W. GARRETT.  
CONTROLLER FOR ELECTRIC MOTORS.  
(Application filed Mar. 26, 1900.)  
(No Model.)  
Patented Jan. 1, 1901.  
5 Sheets—Sheet 4.

WITNESSES:  
G. M. Powell.  
B. M. Smith.

INVENTOR  
F. W. Garrett,  
BY Geo. H. Parmelee,  
his ATTORNEY.

No. 665,320. Patented Jan. 1, 1901.
F. W. GARRETT.
CONTROLLER FOR ELECTRIC MOTORS.
(Application filed Mar. 26, 1900.)
(No Model.) 5 Sheets—Sheet 5.
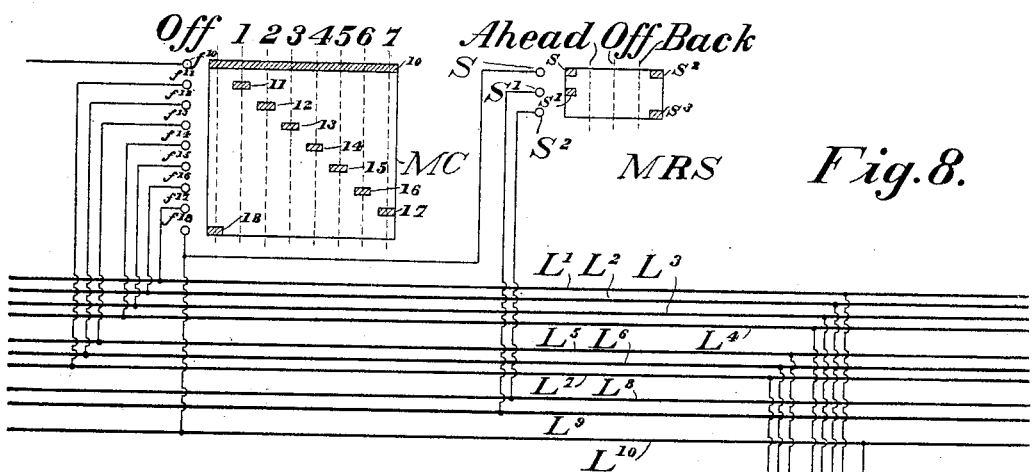
Fig. 8.
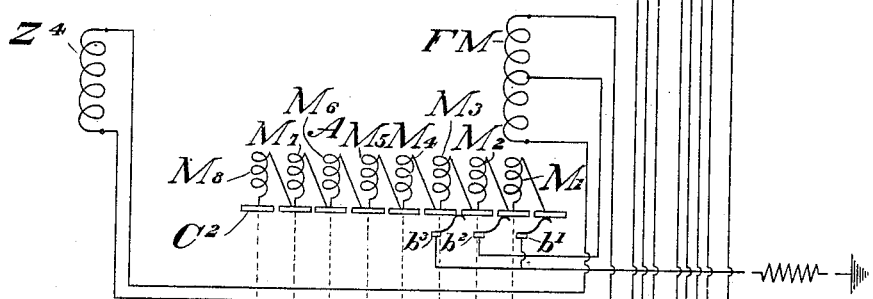
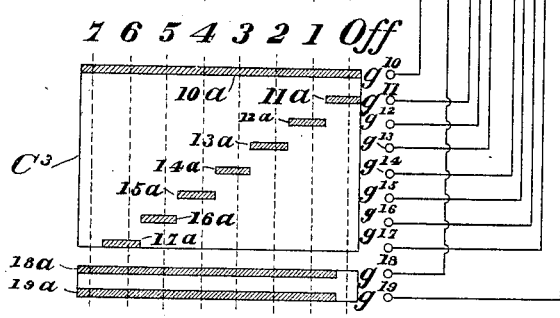
WITNESSES:
G. M. Powell
B. M. Smith
INVENTOR
F. W. Garrett
BY
Geo. H. Parmelee,
his ATTORNEY.

UNITED STATES PATENT OFFICE.

FRANK W. GARRETT, OF JOHNSTOWN, PENNSYLVANIA, ASSIGNOR TO THE LORAIN STEEL COMPANY, OF PENNSYLVANIA.

CONTROLLER FOR ELECTRIC MOTORS.

SPECIFICATION forming part of Letters Patent No. 665,320, dated January 1, 1901.

Application filed March 26, 1900. Serial No. 10,150. (No model.)

*To all whom it may concern:*

Be it known that I, FRANK W. GARRETT, of Johnstown, in the county of Cambria and State of Pennsylvania, have invented a new and useful Control for Electric Motors, of which the following is a full, clear, and exact description, reference being had to the accompanying drawings, which form a part of this specification.

My invention has relation to a system of control for electric motors, and is particularly applicable to electric train control where it is desired to control a train composed of a number of cars or propelling units from any desired point or points on the train through the medium of master-controllers situated at such points and governing the movement of the individual motor-controllers throughout the train.

The objects of my invention are mainly to provide means of improved character for actuating the individual motor-controllers to vary the resistance of the motor-circuits, and thereby the torque and speed of the motors; to provide novel means for controlling the operation of the actuating means through the medium of the master-controllers; to provide means for automatically opening the circuit to the motors whenever from any cause the current-supply fails and for keeping the circuit open until the motor-controller has been returned to its off position, and to provide in general an efficient and reliable system of train control in which the mechanical parts employed are few in number and simple and positive in their operation and in which the car and train wiring is also simplified to a considerable extent.

Other objects of my invention, together with the advantages thereof, will appear from the detailed description hereinafter given.

My invention consists in the combination, with a motor-controller, of an electromagnetic actuator therefor arranged under proper circuit conditions to effect a step-by-step movement of said controller, together with a master-controller and intermediate circuit devices, whereby as the master-controller is moved in a direction to accelerate the motors there is effected a corresponding movement of the motor-controllers; but when the master-controller is moved in the opposite direction the motor-controllers remain in their last working positions until the master-controller reaches its off positions, when the motor-controllers will also return automatically to off position. This non-synchronous movement of the motor-controllers upon the off movement of the master-controller makes it impossible for the motorman to "notch" backward or toward off position (a practice which is injurious to the motor-controllers) and insures a quick continuous return movement of the motor-controllers to off position.

My invention also consists in a controller-actuator comprising a fixed magnet and a series of movable magnets carried upon a rotary member mechanically connected to the drum of a motor-controller and whose poles are arranged to move in a path adjacent to one of the poles of the fixed magnet, together with means for successively energizing said magnets to cause a proper interaction between their individual fields and the fields of the fixed magnet to cause a step-by-step rotation of said rotary member and thereby of the controller-drum. I also provide means for reversing or changing the relative polarity of said magnets at will, to thereby govern the direction of movement of the controller-drum; also, a circuit-opening device arranged to automatically open the motor-circuit whenever the current-supply fails from any cause and which remains open until the motor-controllers have been returned to off position, whereby the motors are guarded against a sudden inrush of current.

My invention also comprises the use of a reversing-switch in connection with or forming a part of each motor-controller, together with an electromagnetic actuator therefor, and means at each master-controller for governing the said actuator.

My invention also consists in the novel construction, combination, and arrangement of devices and electrical circuits connecting and controlling the operation of said devices, as hereinafter described, and pointed out in the appended claims, reference being had to the accompanying drawings, forming part of this specification.

Figure 2:
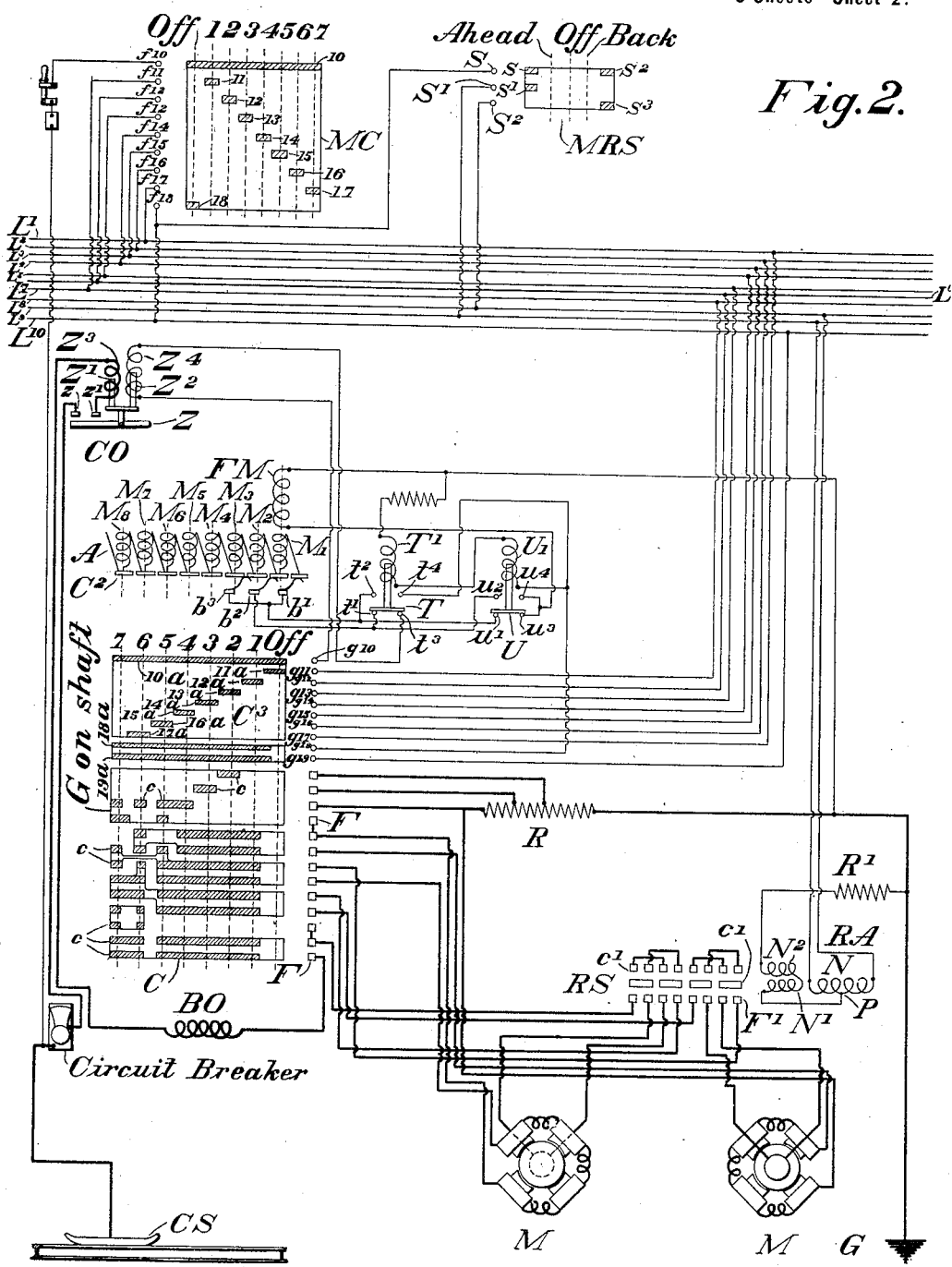
Figure 7:
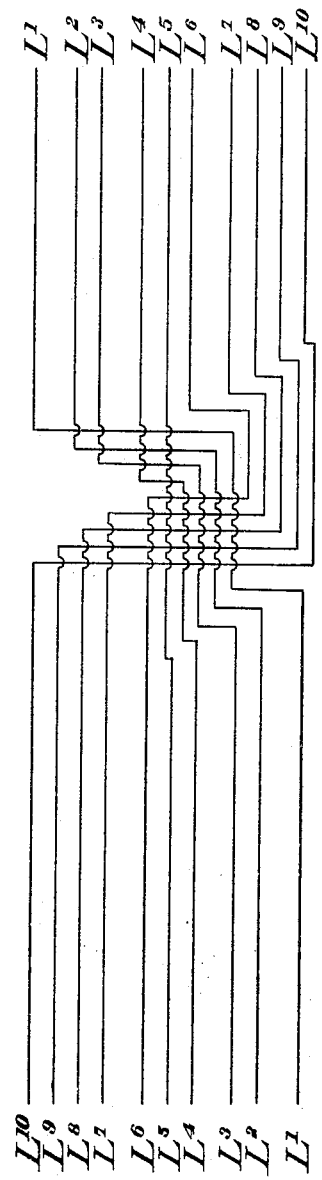

In the drawings, Figure 1 is a diagram illustrating the application of my invention to a train composed of two cars or propelling units. Fig. 2 is a similar view showing on a larger scale the arrangement for a single car or unit. Fig. 3 is a plan view of one of the motor-controllers and its actuator, its casing being partly broken away. Fig. 4 is a detail view of the actuator. Fig. 5 is a detail view of the actuator for the motor-reversing switch. Fig. 6 is a detail view showing more or less conventionally the master reversing-switch. Fig. 7 is a diagram showing the disposition of the train-wires, and Fig. 8 is a diagram illustrating a partial modification.

In Figs. 1 and 2, in order to enable the circuits to be more easily traced, I have represented the circuit connections of the motor-circuits by heavy lines and the circuit connections of the controlling-circuits by light lines.

Referring more specifically to the drawings, the reference characters $L'$ to $L^{10}$, inclusive, designate the several wires or leads which extend throughout the train, being connected between cars by means of any suitable couplings, (indicated at 1.) In the present instance there are ten of these train wires or leads; but the number used in any case will depend upon the particular type or character of the motor-controllers which are employed.

C designates the motor-controllers; R S, the motor-reversing switches; M C, the master-controllers; M R S, the master reversing-switches, and C O the automatic cut-out switches for the motor-circuit.

The motors are designated by M, two motors being shown for each car.

A indicates the controller-actuators, F M the fixed magnet thereof, and $M'$ $M^2$ $M^3$, &c., to $M^8$ the movable magnets of the same.

R designates artificial resistance for connection in circuit with the motors M.

The motor-controller C, in so far as the arrangement of the contacts thereon for changing the connections of the motors M and resistances R is concerned, forms no part of my present invention. Any suitable form of controller provided with contacts for effecting the desired connections may be employed. The drum (shown in Figs. 1 and 2) has a series of contacts $c$ and contact-fingers F, arranged to start the motors connected in series with each other and with the resistance R and by further movement to gradually remove such resistance and then change the motors over to parallel by a series of intermediate steps, in which the fields of the two motors are first connected in multiple with the armatures still in series, then the armatures are connected in multiple and the fields in series, and, finally, the two motors as a whole are connected in multiple. My invention being, however, as above indicated, independent of this particular type of controller, I do not deem it necessary to describe in detail the arrangement of contacts and circuit connections. The circuits in the seven different indicated positions of the controller may be readily traced on the diagrams, if desired.

The motor-reversing switch R S aside from the means for actuating the same is also independent of my invention, and any suitable form of reversing-switch may be employed.

In the diagrams, $c'$ indicates the contacts of a suitable switch, and $F'$ the coöperating contact-fingers thereof.

R A represent the reverse-switch actuator, having a fixed magnet N and two movable magnets $N'$ and $N^2$. The arrangement and operation of this device will be described hereinafter.

Describing in detail the construction and arrangement of parts shown in Fig. 2, the controller-actuator A is preferably secured directly to the shaft of the drum C, (see Fig. 3,) although it may be connected thereto by any mechanical means capable of transmitting its rotary movements to the drum. It consists of the fixed magnet F M and the series of movable magnets $M'$ $M^2$, &c., radially secured to a contact or hub member $a$, (see Fig. 4,) which is in the preferred form above indicated secured directly to the out shaft of the drum C. $C^2$ is a commutator also secured on said shaft and having as many segments as there are magnets. The two ends of each magnet-coil are connected to adjacent segments, and opposite ends of adjacent coils are connected to the same segment. $b'$ $b^2$ $b^3$ are three brushes arranged to bear upon adjacent segments of the commutator, the two outer brushes $b'$ and $b^3$ being connected in multiple with each other.

The master-controller M C preferably consists of a rotary drum upon whose periphery are a series of electrically-connected contacts designated by the numerals 10 to 18, inclusive, said drum having an off position and also seven operative positions, which correspond, respectively, with the seven positions of the motor-controller.

$f^{10}$ to $f^{18}$ designate a series of contact-fingers for engagement with the respective contacts 10 to 18. The contact 10 is a continuous contact and is engaged by its finger $f^{10}$ in the off position and also in each of the working positions. Contacts 11 to 17, inclusive, are short contacts arranged in stepped positions, so that they are engaged successively by the corresponding fingers as the drum is turned through its range of movement. Contact 18 is engaged by the finger $f^{18}$ only when the drum is at off position.

Secured to the shaft of the motor-controller C is a casting $C^3$, which carries a series of contacts designated, respectively, $10^a$ $11^a$ $12^a$, &c., to $17^a$, and which correspond, respectively, with the contacts 10 to 17, inclusive, of the motor-controller. $g^{10}$ to $g^{17}$, inclusive, designate a series of fingers for engagement with said contacts. Contact $10^a$ is a continuous contact, which always maintains its engagement with the finger $g^{10}$. The other contacts are short contacts stepped to correspond with the contacts of the master-controller and also so arranged that one of them will be engaged at each of the first six working positions of the controller C and also at its off position.

The master reversing-switch comprises in the present instance a small switch having three positions—one at "off" position, one at "ahead," and one at "back." It has two contacts $s\ s'$, designed to be engaged by fingers S and S′, slightly beyond its ahead position, and two other contacts $s^2$ and $s^3$, designed to be engaged, respectively, by the finger S and by a third finger $S^2$, slightly beyond its back position. The handle H of said switch is shown in its off position in Fig. 6 and when turned sufficiently far in either direction to effect contact it compresses one or the other of the two fixed springs H′, which acts immediately upon the release of the handle to return the switch to the ahead or back position, with its fingers and contacts disengaged. There is also secured to the shaft of the controller C a casting having two long contacts $18^a$ and $19^a$, which are electrically disconnected from the contacts $10^a$ to $17^a$, and for engagement with these two contacts in all positions of the controller C, except in its off position, are two additional fingers $g^{18}$ and $g^{19}$.

The reverse-switch actuator R A is similar to the controller-actuators, except that it has but two movable magnets N′ N², which are oppositely wound, its fixed magnet being designated N. It is preferably secured directly to the shaft of the reverse-switch R S.

The automatic cut-out C O consists of two separated fixed contacts $z\ z'$, forming a break in the conductor leading from the third rail to the motor-controller, and a movable bridging member Z, having two plungers Z′ Z², attached thereto, which form, respectively, the cores of solenoid-coils $Z^3\ Z^4$, the former being included in the said conductor and the latter being connected in the controlling-circuit in the manner presently described.

I will now describe the various circuit connections between the several devices above described.

The diagram illustrates the invention in connection with the well-known third-rail system, each car being provided with a contact device or shoe C S. This shoe is electrically connected with a finger of the motor-controller through the usual circuit-breaker, the switch C O, blow-out coil B O, &c., and a branch conductor is led from this connection to the first finger $f^{10}$ of the master-controller. Fingers $f^{11}$, $f^{12}$, $f^{13}$, $f^{14}$, $f^{15}$, $f^{16}$, $f^{17}$, and $f^{18}$ are respectively connected to the leads $L^7$, $L^6$, $L^5$, $L^4$, $L^3$, $L^2$, $L'$, and $L^{10}$, and connections from these leads are made, respectively, with the fingers $g^{11}$, $g^{12}$, $g^{13}$, $g^{14}$, $g^{15}$, $g^{16}$, $g^{17}$ and $g^{19}$. Finger S of the master reverse-switch is also connected to the lead $L^{10}$, and fingers S′ and $S^2$ are connectd, respectively, to leads $L^9$ and $L^8$, from which leads connections are made with opposite ends of the coil of the fixed magnet N of the reverse-switch actuator. From the middle portion of said coil is a connection P, leading to ground through magnets $N^2\ N'$ and resistance R′. This resistance, however, may be omitted if the resistance of the magnet-coil is considerable. The middle brush $b^2$ of the commutator $C^2$ is connected to a fixed contact $t'$ of a reversing-switch whose movable contact T is actuated in the present instance by a solenoid T′. Said brush is also connected to a fixed contact $u^2$ of a second and similar reversing-switch, whose movable member U is actuated by a solenoid U′. Brushes $b'$ and $b^3$, which, as above described, are in multiple, are connected to a contact $t^2$ of the first reversing-switch and also to a contact $u'$ of the second switch. Contact-finger $g^{10}$ is connected to a third contact $t^3$ through the solenoid-coil $Z^4$, and finger $g^{18}$ is connected to the fourth terminal $t^4$ of the said switch. Contacts $u^3$ and $u^4$ of the second switch are connected to each other and to ground through the magnet F M of the actuator A. The coils of the two solenoids T′ and U′ are connected in a shunt between connection from the finger $g^{18}$ and the connection from the magnet F M to ground.

The operation is as follows: When the master-controller is in off position, there is no current in the controlling-circuit, since the connection leading from the fingers $f^{18}$ is opened between fingers $g^{18}$ and $g^{19}$. By throwing the handle H of the master reverse-controller to a point somewhat beyond its ahead position a circuit is completed from the finger $f^{18}$, through the fingers S S′ and contacts $s\ s'$, one-half of the magnet-coil N, and the two magnet-coils N′ N², to ground. If the motor-reversing switch is at back position, the relative polarity of the three magnets is such that (see Fig. 5) magnets N N² will have adjacent poles of opposite polarity, while magnets N N′ will have adjacent poles of similar polarity. Consequently magnet N′ will be attracted and magnet N′ will be repulsed by the magnet N and the shaft of the reversing-switch will be rotated to a position where magnet N² is opposite the magnet N, and this movement will change the reversing-switch to ahead position. If the said switch was already at that position, it will simply remain there. If the handle H be moved to make contact in the back position, the circuit is through fingers S S² and contacts $s^2\ s^3$ and thence to and through magnet-coils N N′ N²; but in this case the current goes through the other half of the coil N and in the opposite direction, thereby reversing the polarity of this magnet. If, therefore, the reversing-switch is at its ahead position, it will be moved to back position. The springs H′ will always act to return the handle H to the point of indicated position with the contacts disengaged, so that no current is uselessly kept in the coils of the actuator R A. When the master-controller is moved from its off position to position 1, the circuit is from contact 10 to contact 11, finger $f^{11}$, finger $g^{11}$, contact $11^a$, contact $10^a$, finger $g^{10}$ to coil $Z^4$, through switch T to brush $b^2$, to and through coils $M'$ $M^2$ of the controller-actuator to brushes $b'$ $b^3$ to switch U, and through magnet F M to ground. The magnets are so wound that adjacent poles of the magnets $M'$ and F M will have a corresponding polarity, while adjacent poles of magnets $M^2$ and F M will be of opposite polarity. The shaft of the controller C will therefore be rotated until the finger $g^{11}$ leaves the contact $11^a$, and thus breaks the controller-circuit. This movement will bring the controller C to its first indicated position, where it will remain until the master-controller is moved to bring contact-finger $f^{12}$ into engagement with contact 12, when circuit will be again completed, this time through finger $g^{12}$, contacts $12^a$ $10^a$, finger $g^{10}$, and connections to the actuator-magnets. Magnets $M^2$ and $M^3$ are now energized and the controller-drum is moved another step, or to position 2. Continued movement of the master-controller causes a successive engagement of its contacts, the energization of successive pairs of magnets through the respective contacts $13^a$, $14^a$, &c., and a continued step-by-step movement of the controller C through its several positions. Each step in the movement of the controller C brings, as will be readily seen, the brushes $b'$ $b^2$ $b^3$ into engagement with the proper segments of the commutator for the next step and also causes the engagement of the proper contact of the $10^a$ group with its corresponding finger to complete the next circuit through the actuator-magnets. The brushes $b'$ $b^2$ $b^3$ are staggered, as shown, to prevent short-circuiting of the active magnets. When the master-controller is moved back to off position from any of its running positions, there will be no movement of the controller C and its actuator until the off position of the master-controller is reached, owing to the fact that the controller-circuit will during such movement remain open at the $10^a$ group of contacts, as will be readily seen. When, however, the master-controller reaches its off position, a circuit is completed through finger $f^{10}$, contacts 10 and 18, finger $f^{18}$, lead $L^{10}$, finger $g^{19}$, contacts $19^a$ $18^a$, finger $g^{18}$, and solenoid-coils $T'$ and $U'$ to ground. These coils being energized, the switch-contacts U and T are moved, respectively, from the contacts $u'$ $u^3$ and $t'$ $t^3$ to the contacts $u^2$ $u^4$ and $t^2$ $t^4$, and current passes through T to brushes $b'$ $b^3$ and the coils of the corresponding pair of movable magnets to brush $b^2$, and thence through switch U and coil F M to ground. The current in the movable magnets being thus reversed, the controller-shaft C will be moved one step toward off position and by this movement will shift the brushes $b'$ $b^2$ $b^3$ to so energize the actuator-magnets as to cause another step, and this action will continue until the controller C reaches off position and the fingers $g^{18}$ and $g^{19}$ leave the contacts $18^a$ and $19^a$, and thereby open the controlling-circuit. There is thus obtained a practically continuous and quick return movement of the controller C, it being impossible for the motorman to notch said controller back to off position.

In the modification shown in Fig. 8 I dispense with the reversing-switches T and U, and instead of reversing the current in the coils of the movable magnets of the actuator I provide for reversing the polarity of the fixed magnet F M. This I do by connecting brush $b^2$ to the middle portion of its coil and fingers $g^{10}$ and $g^{18}$ to opposite ends thereof, brushes $b'$ and $b^3$ being connected to ground. Consequently when circuit is completed through any one of the contacts $11^a$ to $17^a$ said magnet will have one polarity, and when circuit is completed through contacts $18^a$ and $19^a$ it will have a different polarity.

It will be readily seen that inasmuch as the master-controllers throughout the train are connected in multiple between the train wires or leads the operation of any one of them will effect the circuit changes above described and that such operation will effect the actuation of all the motor-controllers throughout the train. It is obvious that while I have shown but one master-controller on each car one of such controllers may be used at each end.

The train-wires may be crossed on each car, as indicated in Fig. 7, so that whichever end of two cars may be connected corresponding wires on each will meet each other.

In case it is not desired to depend upon the friction of the contact-fingers to hold the motor-controlling drums in their several positions any suitable friction or locking device may be employed for the purpose.

In the event of the current-supply failing from any cause the motor-controllers will for the time being be left in the positions which they occupy at that time. The failure of the current in the coils $Z^3$ $Z^4$, however, opens the switch C O and leaves the motor-circuit open. When the current-supply is restored, current will flow through the master-controller in its off position into the controlling-circuit through the contacts $19^a$ $18^a$ and through solenoid-coils $T'$ $U'$ to ground, thereby closing switch-contacts T and U in their reverse positions. As soon as these contacts are closed current flows into the actuator and effects the return movement of the motor-controller from whatever point it may have been left. The operation of the master-controller will now close the circuit through the solenoid-coils $Z^3$ $Z^4$, thereby closing the cut-out switch C O and restoring the motor-circuit.

With reference to the motor-controller actuator it will be seen that for each normal position of the commutator there is effected a certain definite change in the internal circuits of the actuator and that said commutator has a definite normal position for each normal position of the motor-controller, while the normal positions of the latter correspond definitely to the normal positions of the master-controller, and that by reason of the 10ᵃ group of contacts no current can flow into the actuator during its forward movement until the master-controller is moved to a certain definite position relative to the motor-controller. The contacts of this group therefore control the duration of each movement of the actuator for each forward movement of the master-controller, while the commutator controls the internal circuits of the actuator to produce such movements. I prefer, as above stated, to attach the actuator-commutator directly to the shaft of the motor-controller, since this insures the maintenance of the necessary definite relations between the positions of the commutator and the motor-controller. Furthermore, the short step-by-step movements of the actuator, in which but little momentum is acquired, are well adapted for direct communication to the motor-controller.

It is obvious that many changes can be made in the details of my invention without departing from the spirit and scope thereof. Hence I do not wish to be limited to the specific embodiment which I have herein shown and described.

Having thus described my invention, what I claim, and desire to secure by Letters Patent, is—

1. The combination with the motors of an electrically-propelled vehicle, and a controller therefor having a movable contact-carrying member, of an electromagnetic actuator for said member, and means controlled by the movement of said member for varying at each normal position thereof the internal circuits of said actuator.

2. The combination with the motors of an electrically-propelled vehicle, and a controller therefor having a movable contact-carrying member, of an actuator for said member comprising a plurality of magnets attached to said member, and a coöperating fixed magnet, together with means for effecting successive energization of the first-named magnets and relative polarity thereof with respect to the fixed magnets to cause a step-by-step movement of said member.

3. The herein-described controller-actuator, consisting of a rotary support mechanically connected to the controller, a series of radial magnets attached to said support, a coöperating fixed magnet and means for varying the internal circuit of said actuator to produce a step-by-step movement thereof.

4. The herein-described controller-actuator, consisting of a rotary supporting member, a plurality of radial magnets carried thereby, a coöperating fixed magnet and means for energizing said radial magnets in pairs having their individual magnets of opposite polarity.

5. The herein-described controller-actuator, consisting of a rotary supporting member, a plurality of radial magnets carried thereby, a coöperating fixed magnet, and means for energizing said magnets in successive pairs, whose individual magnets are of opposite polarity, and for reversing the polarity of each magnet as it reaches a certain position with respect to the fixed magnet.

6. The herein-described controller-actuator, consisting of a rotary supporting member, a plurality of radial magnets carried thereby, a coöperating fixed magnet, a source of current-supply for said magnets, and commutating devices arranged to effect a successive energization of said radial magnets.

7. The combination with a motor-controller having a movable contact-carrying member, of an actuator therefor, comprising a plurality of movable magnets connected to said member, a coöperating fixed magnet, commutating devices for effecting a successive energization of said movable magnets, and means actuated by said magnets for controlling the current-supply thereto.

8. In a system of electric train control, the combination of a controller for the propelling-motors, of an electromagnetic actuator therefor having a plurality of movable electromagnets, and a coöperating fixed magnet, a master-controller, and means governed by the combined action of the master and motor controller for effecting a step-by-step movement of said actuator.

9. In a system of electric train control, the combination of a controller for the propelling-motors, a series of magnets connected to the movable member of said controller, a master-controller, circuit connections between the master-controller and the said magnets for energizing the latter, and means governed by the movement of the motor-controller for governing said connections.

10. In a system of electric train control, the combination of a motor-controller, a master-controller, an electromagnetic actuator for the motor-controller, commutating devices actuated by the motor-controller to vary the internal circuits of the said actuator, and circuit-controlling devices also actuated by movement of the motor-controller for opening and closing the circuit to the said actuator, and connections between said circuit-controlling devices and the master-controller.

11. In a system of electric train control, the combination of a motor-controller, an actuating device connected thereto and having a plurality of electromagnets, a master-controller, a group of supplemental contact devices carried by the motor-controller, and circuit connections between the master-controller and the said magnets effected through said supplemental contacts.

12. In a system of electric train control, the combination of a motor-controller, an actuating device therefor comprising a plurality of movable electromagnets and a fixed electromagnet, a commutator to whose segments the coils of said magnets are connected, circuit connections between the master-controller and the brushes of the commutator, and means carried by the motor-controller for controlling said connections.

13. In a system of electric train control, the combination of a motor-controller having contacts for effecting the control of the motors, and also a group of additional contacts, a master-controller having contacts corresponding to the contacts of said group, means for establishing a circuit connection between any one of the master-controller contacts and a corresponding contact of said group, a motor-controller actuator having a plurality of actuating-magnets, and means for effecting a connection between the individual contacts of the said group, and the said magnets.

14. In a system of electric train control, the combination of a motor-controller having contacts for controlling the motor-circuits, a group of contacts connected to the contact-carrying member of the controller to move therewith, commutating devices also connected to and carried by and moving with said member, an electromagnetic actuator whose magnets are controlled by the contacts of said group and by the commutating devices, and a master-controller for governing the circuit connections of the said contacts.

15. In a system of electric train control, the combination with a motor-controller, of an actuating device therefor comprising a series of electromagnets connected to the movable member of the controller to move therewith, and a fixed magnet, a commutator to which the coils of said electromagnet are connected, a group of contacts carried by the motor-controller for controlling the circuit to the brushes of the commutator and a master-controller for controlling the circuit connections of said contacts.

16. In a system of electric train control, the combination with a motor-controller, and an electromagnetic actuator therefor, of a master-controller, and circuit-controlling devices which open, close and change the circuit of the actuating device at predetermined times, whereby a step-by-step movement of said master-controller in a forward direction operates said actuator to effect a corresponding step-by-step movement of the motor-controller, but whereby during the return movement of said master-controller the actuator is inoperative until the master-controller reaches its off position.

17. In a system of electric train control, the combination with a motor-controller, a series of electromagnets connected thereto to actuate the same, a coöperating fixed magnet, a commutator having a segment for each magnet of said series, the coils of adjacent magnets having their opposite ends connected to the same segment, three brushes arranged to engage three adjacent commutator-segments, two of said brushes being connected in multiple with one side of the controlling-circuit, and means for effecting at will changes in said circuit to cause a relative polarity of certain of said magnets to move said controller either backward or forward.

18. In a system of electric train control, the combination with a motor-controller, and an electromagnetic actuating device therefor having a plurality of magnets, a controlling-circuit including the magnets of said actuating device, a master-controller which primarily governs the energization of said magnets, a commutating device carried by the motor-controller for varying at each normal position thereof the internal circuits of the said actuator and contact devices operated by the motor-controller and interposed between the master-controller and the said magnets, whereby each step in the movement of the motor-controller opens the circuit to said magnets until the master-controller is moved to its next position.

19. In a system of electric train control, the combination with a motor-controller whose contact-carrying member has a plurality of operative positions, an electromagnetic device for imparting a step-by-step movement to said member, a master-controller having a different operative position for each operative position of the motor-controller, contact devices carried by the motor-controller for effecting circuit connections between the magnets of the actuator and the master-controller in each position of the latter, and for opening said connections after each successive step of movement of the motor-controller, and holding the same open until the master-controller has been moved to its next operative position or back to its off position, together with means for varying at each normal position of the motor-controller the internal circuits of said electromagnetic device.

20. The combination with a motor-controller, an electromagnetic actuator therefor, a commutating device for effecting a different internal circuit condition in the said actuator for each definite position of the motor-controller and a master-controller, of a series of supplemental contacts carried by the motor-controller, through which circuit connections are effected between the master-controller and the actuator, said contacts being arranged to successively open such connections as the successive step-by-step movements of the motor-controller are effected, and the master-controller having its contacts arranged relatively thereto to reëstablish such connections at each succeeding operative position of its forward movement and at its off position, but not during its return movement.

21. In a system of electric train control, the combination with a motor-reversing switch, of an actuator therefor consisting of a pair of oppositely-wound electromagnets operatively connected to the movable member of said switch, and a fixed electromagnet, a master controlling device and circuit connections controlled thereby for effecting at will such relative polarity of the three magnets as to move the reversing-switch in either direction.

22. In a system of electric train control, the combination with a motor-controller, an actuator therefor and a master-controller governing said actuator, of a motor-reversing switch, a reversing-switch actuator and a master reversing device for controlling the reversing-actuator, together with means whereby the master reversing device can be operated effectively only when the master controlling-switch is at its off position.

23. In a system of train control, the combination of a motor-controller, an actuator therefor, and a master-controller for governing said actuator, together with circuit-controlling devices which open and close the circuit to said actuator at predetermined times whereby said master-controller effects the operation of the actuator only during the forward movement of the master-controller, or when the latter is at its off position and the motor-controller is in an operative position.

24. In a system of electric train control, the combination with a motor-circuit, and a controlling-circuit in shunt or multiple therewith, of an automatic cut-out or circuit-opening device for the motor-circuit, said device having two actuating-coils, one of which is included in the motor-circuit and the other in the controlling-circuit.

25. In a system of electric train control, the combination of a motor-circuit, a motor-controller therein, a controlling-circuit, a master-controller therein, and means whereby whenever current is passing in the controlling-circuit, the operation of the master-controller will effect the return of the motor-controller to its off position, and means for automatically opening the motor-circuit whenever the current-supply fails, and for holding the same open until the motor-controller has been returned to its off position.

26. In a system of electric train control, the combination of a motor-circuit, a motor-controller therein, a controlling-circuit, a master-controller therein, and means whereby whenever current is passing in the controlling-circuit, the master-controller may be operated to effect the return of the motor-controller to its off position, and means for automatically opening the motor-circuit whenever the current-supply fails, and without opening the controlling-circuit, and means for automatically closing said motor-circuit when the current-supply is resumed and the motor-controller has been returned to its off position.

27. In a system of electric train control, the combination of a motor-circuit, a motor-controller therein, a controlling-circuit, a motor-controller actuator and a master-controller in said controlling-circuit, an automatic cut-out switch arranged to open the motor-circuit upon failure of current-supply, without opening the controlling-circuit, and means for automatically closing said switch when the current-supply is resumed and the motor-controller is at its off position.

28. In a system of electric train control, the combination of a motor-controller, of an electromagnetic actuator therefor, having a plurality of movable electromagnets, a master-controller which primarily governs the circuit connections of the said magnets, and a commutating device carried by the motor-controller and having a definite normal position for each normal position of the said controller, and adapted at each position to vary the circuit to said magnets, together with contact devices intermediate the master-controller and commutating device for making and breaking the circuit at predetermined times.

29. In a system of electric train control, the combination of a motor-controller, an electromagnetic actuator therefor, a commutator for varying the internal circuits of the actuator, said commutator having a certain definite normal position for each position of the motor-controller, a master-controller, and contact devices and circuit connections intermediate the master-controller and the commutator for controlling the current-supply to said actuator.

30. In a system of electric train control, the combination of a motor-controller, an electromagnetic actuator for said controller, a commutator for varying the internal circuits of said actuator at each normal position of the controller, a master-controller, and circuit-controlling devices between the master-controller and the commutator controlled by the movement of the motor-controller for making and breaking the circuit connections to the commutator.

31. In a system of electric train control, the combination of a motor-controller, an electromagnetic actuator directly connected to said controller, and means actuated by movement of the motor-controller for varying the internal circuits of said actuator to effect a step-by-step movement of said actuator and thereby of the controller.

32. In a system of electric train control, the combination of a motor-controller, an electromagnetic actuator directly connected to said controller, and means for varying the internal circuits of said actuator to produce a step-by-step movement thereof in one direction, and a continuous movement thereof in the opposite direction.

In testimony whereof I have affixed my signature in presence of two witnesses.

FRANK W. GARRETT.

Witnesses:
BLANCHE M. SMITH,
H. W. SMITH.